United States Patent [19]

Honma et al.

[11] Patent Number: 5,237,248

[45] Date of Patent: Aug. 17, 1993

[54] CONTROL CIRCUIT HAVING DOUBLE-POLE DOUBLE-THROW SWITCHING DEVICE FOR ELECTRICALLY POWERED TOOL

[75] Inventors: Shigeru Honma; Genji Hirata; Takahito Ishizuka; Toshio Mizoguchi, all of Katsuta, Japan

[73] Assignee: Hitachi Koki Co., Ltd., Tokyo, Japan

[21] Appl. No.: 858,585

[22] Filed: Mar. 27, 1992

[30] Foreign Application Priority Data

Mar. 28, 1991 [JP] Japan .................. 3-19349[U]

[51] Int. Cl.$^5$ ............................................. H02P 3/00
[52] U.S. Cl. ..................................... 318/369; 318/265
[58] Field of Search ............ 318/369, 370, 375, 379, 318/381, 759, 760, 273, 434, 265; 361/23, 31, 5, 78, 93, 3; 81/469; 192/0.02 R, 0.049, 1.2

[56] References Cited

U.S. PATENT DOCUMENTS

| | | | |
|---|---|---|---|
| 3,628,112 | 12/1971 | Gross | 318/369 X |
| 3,673,481 | 6/1972 | Hardin | 318/251 X |
| 4,144,482 | 3/1979 | Schwab | 318/375 X |
| 4,145,640 | 3/1979 | Kipp et al. | 318/139 |
| 4,556,831 | 12/1985 | Sakamoto et al. | 318/434 |
| 4,812,728 | 3/1989 | Yang | 318/760 |
| 4,836,349 | 6/1989 | Sakamoto et al. | |
| 4,922,161 | 5/1990 | Gilliland et al. | 318/375 X |
| 5,019,023 | 5/1991 | Kurosawa | |
| 5,099,184 | 3/1992 | Hornung et al. | 318/375 |

FOREIGN PATENT DOCUMENTS

| | | |
|---|---|---|
| 726394 | 3/1955 | United Kingdom |
| 1289614 | 9/1972 | United Kingdom |
| 1449358 | 9/1976 | United Kingdom |
| 1550198 | 8/1979 | United Kingdom |

Primary Examiner—Jonathan Wysocki
Attorney, Agent, or Firm—Sughrue, Mion, Zinn, Macpeak & Seas

[57] ABSTRACT

A control circuit for use in an electrically powered tool, such as a screw driver, includes a double-pole double-throw (DPDT) relay switch having two wiper contacts movable between ON and OFF positions. A motor is connected to a power supply through the DPDT relay switch. To stop the rotations of the motor, the two wiper contacts trip from ON positions to OFF positions in ganged fashion. With the use of DPDT relay switch, even if one of the two wiper contacts undergoes chattering actions at its OFF position, the remaining wiper contact allows a large braking current to flow in a closed loop, whereby contacts of the DPDT relay switch are prevented from being melted caused by the braking current.

3 Claims, 2 Drawing Sheets

CONTROL CIRCUIT HAVING DOUBLE-POLE DOUBLE-THROW SWITCHING DEVICE FOR ELECTRICALLY POWERED TOOL

BACKGROUND OF THE INVENTION

The present invention relates to an improvement of a control circuit for use in electrically powered tools, such as screw driver, a drill or the like.

A conventional electrically powered tool is shown in FIG. 1. An arrangement and operation of the tool is described in detail in U.S. Pat. No. 5,019,023 to Kurosawa, so that a detailed description thereof is omitted herein. Briefly, the tool 31 has a clutch 33 axially disposed between a motor shaft 35 and an output shaft 34. The clutch 33 is coupled at one side to the motor shaft 35 and at opposite side to the output shaft 34. When a load greater than a predetermined level determined by a tightening spring 32 is imparted on the output shaft 34 during drilling or screwing, the output shaft 34 is decoupled from the clutch 33 with an axial movement of the clutch 33. An interlocking switch 7 is provided which performs ON and OFF actions in interlocking relation with the actuation of the clutch 33. When the clutch 33 is decoupled from the output shaft 34, the switch 7 is rendered ON, and in response thereto rotations of the motor are stopped.

FIG. 2 is a circuit diagram showing a control circuit for stopping the rotations of the motor. In the circuit shown therein, a d.c. power supply 1, a main switch 2, a single-pole relay switch 10 and a motor 4 are connected in series. A series connection of a relay coil 5 and a thyristor 6 is connected in parallel across the relay switch 10 and the motor 4. A series connection of the switch 7 and resistors 8 and 9 is further connected in parallel across the relay switch 10 and the motor 4.

When the switch 7 is rendered ON, the relay coil 5 is energized, thereby causing a wiper contact of the relay switch 10 to trip over to OFF position. However, the wiper contact of the relay switch 10 is liable to undergo chattering or fluttering actions at the OFF position, during which a large braking current flows in the relay switch 10, resulting in melting of the contact of the relay switch 10.

SUMMARY OF THE INVENTION

The present invention has been made to solve the above-described problem and, accordingly, it is an object of the present invention to prevent a contact of a relay switch from being melted and to thus prolong a service life of a control circuit for use in an electrically powered tool. An electrically powered tool of the present invention has a d.c. power supply, a motor having a motor shaft, an output shaft operatively coupled to the motor shaft, and a clutch mechanism axially disposed between the motor shaft and the output shaft for selectively transmitting rotations of the motor shaft to the output shaft. A switch is provided in association with the clutch mechanism, which performs ON and OFF actions in interlocking relation with actuations of the clutch mechanism. Specifically, the switch is rendered ON when the clutch mechanism disconnects the output shaft from the motor shaft.

In accordance with a control circuit of the present invention, a double-pole double-throw switching means is connected between the d.c. power supply and the motor. The switching means has two wiper contacts tripable in ganged fashion between ON positions and OFF positions wherein the motor is connected to the d.c. power supply when the two wiper contacts are in ON positions whereas the motor is disconnected from the d.c. power supply when the two wiper contacts are in OFF positions. A closed loop is connected to the motor when at least one of the two wiper contacts are held in OFF position, whereby a braking current produced when the motor is disconnected from the d.c. power supply is allowed to flow in the closed loop. Therefore, generation of arc discharge can be greatly reduced and hence the service life of control circuit is prolonged.

BRIEF DESCRIPTION OF THE DRAWINGS

The particular feature and advantages of the present invention as well as other objects will become apparent from the following description taken in connection with the accompanying drawings, in which.

DETAILED DESCRIPTION OF THE PREFERRED EMBODIMENT

Figure 1:
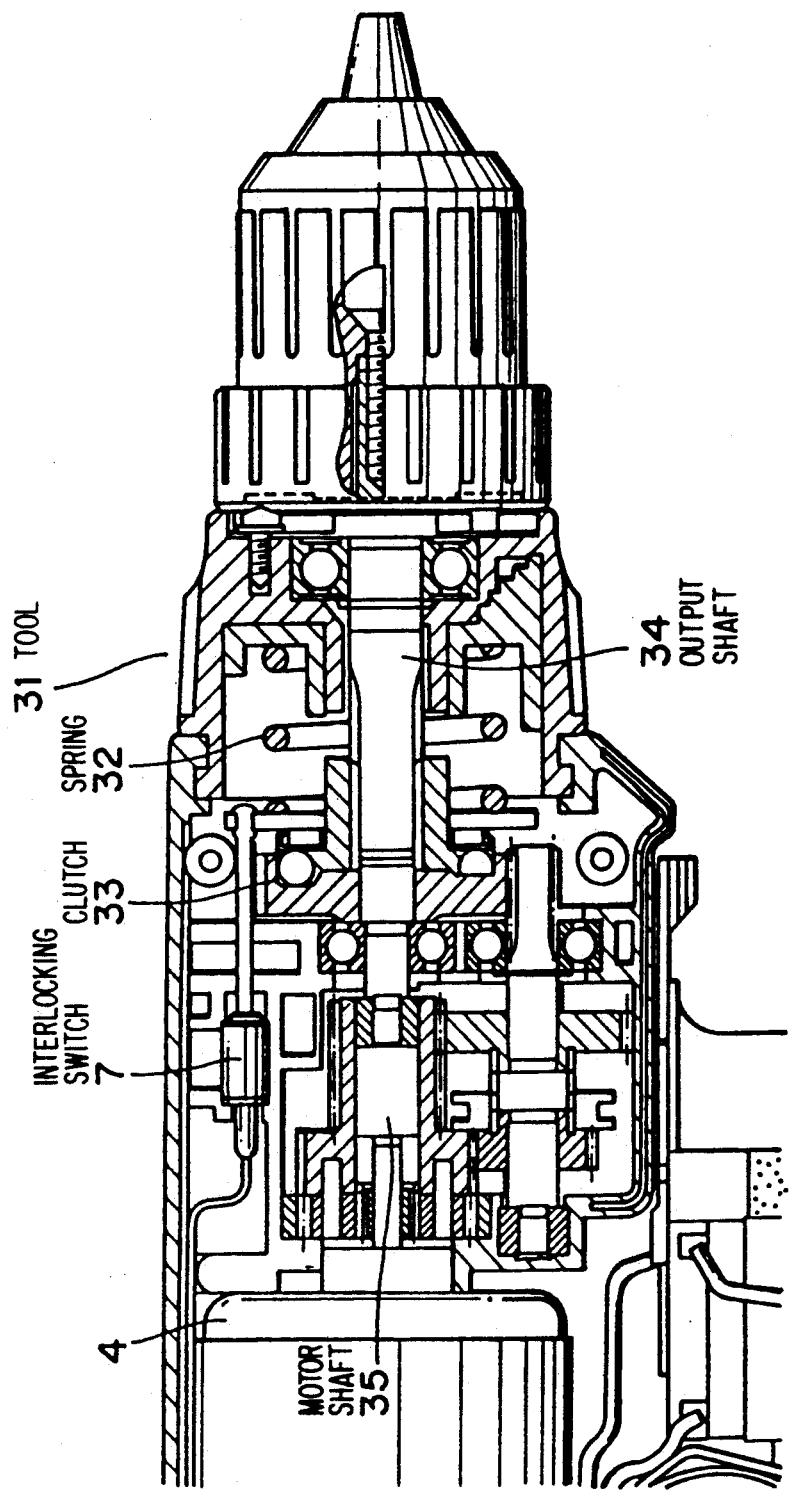
FIG. 1 is a vertical cross-sectional view showing a conventional electrically powered tool.
Figure 2:
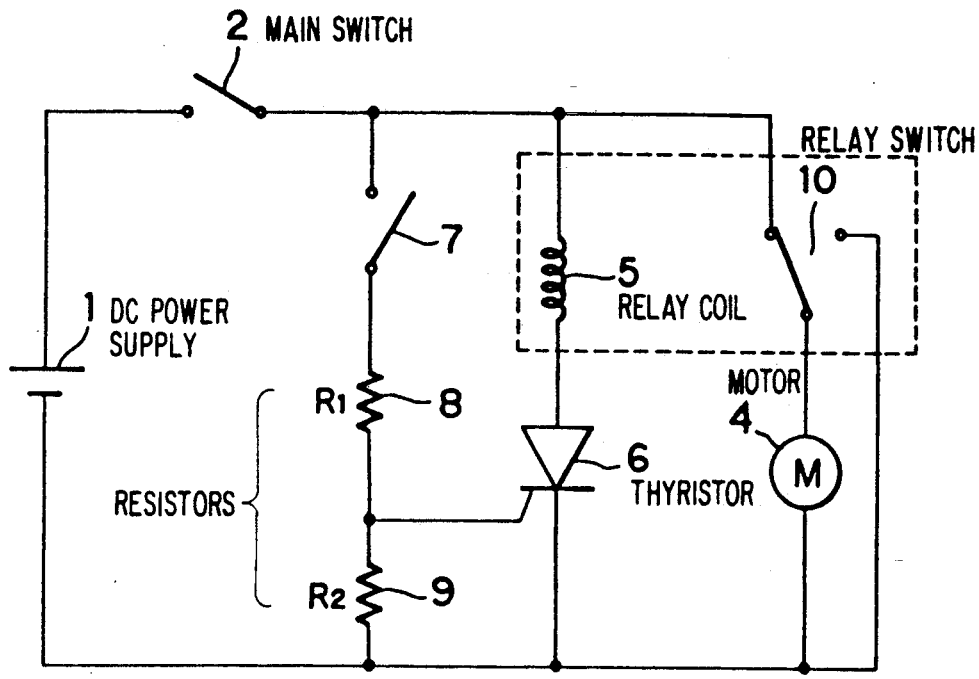
FIG. 2 is an electrical circuit diagram showing a conventional control circuit for the electrically powered tool shown in FIG. 1.
Figure 3:
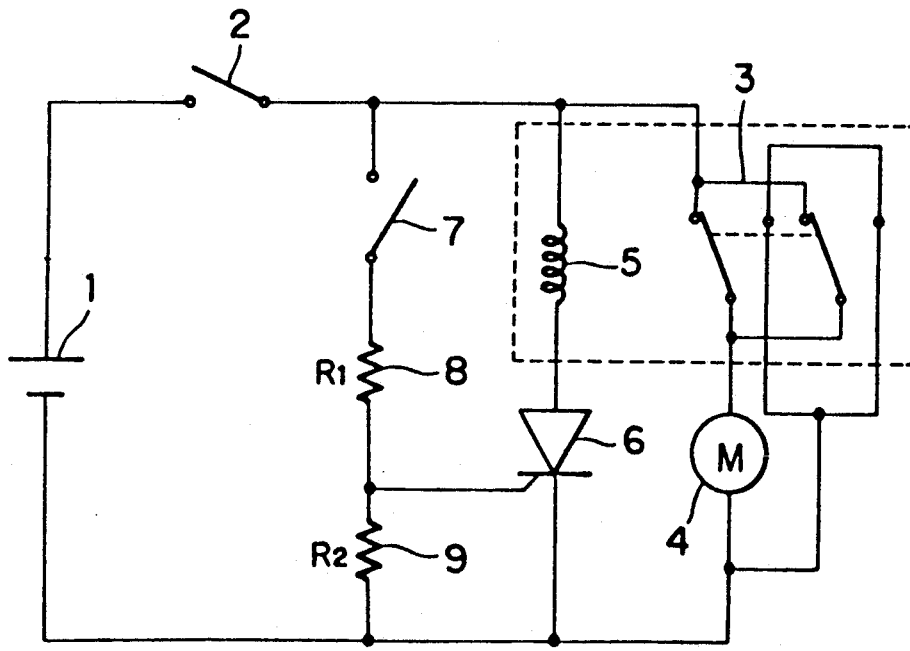
FIG. 3 is an electrical circuit diagram showing a control circuit for the electrically powered tool according to a preferred embodiment of the present invention.

As shown in FIG. 3, a control circuit for use in an electrically powered tool shown in FIG. 1 is basically configured by a series circuit made up of a d.c. power supply 1, a main switch 2, a double-pole double-throw relay switch (hereinafter referred to as "DPDT relay switch") 3 and a motor 4. A series connection of a relay coil 5 and a thyristor 6 is connected in parallel across the DPDT relay switch 3 and the motor 4. The relay coil 5 is provided for changing over the DPDT relay switch 3. The DPDT relay switch 3 has two wiper contacts simultaneously tripable between ON positions and OFF positions. The two wiper contacts are normally held in ON positions but are tripped to OFF positions when the relay coil 5 is energized. When the wiper contacts are in OFF positions, the motor 4 is disconnected from the power supply 1 whereas when the wiper contacts are in ON positions, the motor 4 is connected to the power supply 1 provided that the main switch 2 is ON.

A series connection of an interlocking switch 7 and resistors 8 and 9 is further connected in parallel across the DPDT relay switch 3 and the motor 4. A junction of the resistors 8 and 9 is connected to the gate of the thyristor 6. The interlocking switch 7 is turned ON and OFF in interlocking relation with the actuation of the clutch 33 (see FIG. 1). Specifically, the switch 7 is held in OFF state when the clutch 33 connects rotations of the motor 4 to the output shaft 34. The switch 7 is rendered ON when the clutch 33 disconnects the output shaft 34 from the motor 4.

In operation, when the main switch 2 is rendered ON, a current flows in the motor 4 through the DPDT relay switch 3, since the wiper contacts of the DPDT relay switch 3 are held in ON positions. At this time, the switch 7 is in OFF state and the rotations of the motor 4 is transmitted to the output shaft 34. When the clutch 33 is actuated and the switch 7 is turned ON, the thyristor 6 is triggered with a supply of a current to the gate thereof, thereby allowing a current to flow in the relay coil 5 and the thyristor 6. Accordingly, the relay coil 5 is energized and the two wiper contacts of the DPDT relay switch 3 are simultaneously tripped over to OFF positions. When the two wiper contacts of the DPDT relay switch 3 are in OFF positions, a closed loop is connected to the motor 4 when at least one of the two wiper contacts are connected to the OFF position, whereby a braking current flowing in the motor 4 when the motor 4 is disconnected from the d.c. power supply 1 is allowed to flow in the closed loop and hence the rotations of the motor 4 is stopped.

According to the present invention, with the use of a double-pole double-throw relay switch, production of arc discharge can be minimized and the service life of the relay switch is prolonged, since one of two wiper contacts of the relay switch serves as a by-pass for the braking current in the case when the remaining wire contact undergoes chattering actions.

Although the present invention has been described with respect to a specific embodiment, it will be appreciated by one skilled in the art that a variety of changes may be made without departing from the scope of the appended claims.

What is claimed is:

1. An electrically powered tool comprising:
   a d.c. power supply;
   a motor having a motor shaft;
   an output shaft operatively coupled to said motor shaft;
   double-pole double-throw switching means connected between said d.c. power supply and said motor, said switching means having two switching elements simultaneously tripable between ON positions and OFF positions, said switching elements being connected in parallel with each other, and wherein said motor is connected to said d.c. power supply when said two switching elements are in said ON positions, and wherein said motor is disconnected from said d.c. power supply when said two switching elements are in said OFF positions; and
   a closed loop connectable to said motor through at least one of said two switching elements when said switching elements are held in said OFF position, even when the other switching element is caused to flutter or chatter, and whereby a braking current produced when said motor is disconnected from said d.c. power supply is allowed to flow into said closed loop through said at least one of said two switching elements to prevent the switching elements from melting.

2. The tool according to claim 1, wherein said switching elements are normally held in said ON positions.

3. The tool according to claim 2, further comprises a clutch mechanism intervened between said motor shaft and said output shaft for selectively transmitting rotations of said motor shaft to said output shaft, and a switch for performing ON and OFF actions in interlocking relation with actuations of said clutch mechanism, said switch being rendered ON when said clutch mechanism disconnects said output shaft from said motor shaft, and wherein said switching elements of said double-pole double-throw switching means are tripped to said OFF positions in accordance with the ON action of said switch.

* * * * *